United States Patent Office 2,873,195
Patented Feb. 10, 1959

2,873,195

RUST INHIBITING COMPOSITION

Martin Ganzler, Edison Township, Middlesex County, and Gerard Wachtel, Glen Ridge, N. J., assignors to Chesebrough-Pond's, Inc., a corporation of New York No Drawing. Application November 17, 1955
Serial No. 547,562

6 Claims. (Cl. 106—14)

This invention relates to a rust inhibiting composition comprising petrolatum and containing oil soluble petroleum sulfonate material and an alkyl substituted phenoxy tetraethoxyethanol.

It has been a practice to apply oil coatings on metals and alloys, particularly iron and steel alloys, for protection against corrosion or rusting; but it is well known that such a coating is ineffective unless specific rust or corrosion inhibitors are added to the oil. Many additives have been employed or proposed for this purpose, including degras, oil-soluble petroleum sulfonates, phosphoric acid esters, fatty acids, hydroxy fatty acids, dicarboxylic acids and their esters, along with many other synthetic chemicals.

Oil coatings are not entirely impervious to moisture or moisture vapor, and water is appreciably soluble in both mineral and fatty oils, to a sufficient degree to permit rust formation. Likewise, metal surfaces may have moisture prior to the application of the oil coating, in amounts sufficient to cause rust formation beneath the oil coating when applied. It is generally believed that the additives to oil coatings which improve the rust inhibitive properties of such coatings are selectively adsorbed by the metal surface to provide an interface which prevents access and contact of moisture with the metal surface. Also, it has been noted that some inhibitors have a preferential wetting effect upon metal surfaces and will displace water or adsorbed moisture if originally present at the time of coating.

Many of the substances which have been found to be more or less effective as rust inhibitors have a relatively large hydrocarbon radical which tends to make the substance soluble in oil, along with a polar group such as a hydroxyl or carboxylic acid group which is believed to cause the adsorption at the metal surface.

Coatings formed with a fluid oil are relatively thin, tend to drain from the object coated, and are removed by mild abrasion, such as a salt water spray. Thus many oil coatings, even with inhibitors, may give a fairly effective protection against rusting caused by atmospheric moisture vapor, but fail badly when subjected to the well known salt water spray test. To overcome this type of failure, it has been proposed to coat metals with various solid coatings including asphalt, various plastic materials, lacquers, and the like.

One of the objects of the present invention is to provide a semi-solid or soft coating of relatively low melting point containing inhibitors, which can be applied to form coatings which are thicker and more resistant to displacement than oil films, which can withstand the mild abrasive action of salt water spray, and which can very easily be removed when desired by common solvents such as gasoline, naphtha, benzene, and the like.

Another object of the invention is to provide a rust inhibiting composition which is semi-solid, and which can be applied mechanically by a stiff brush, swab, spatula or roller; and which has a sufficiently low melting point so that in the molten condition it can be sprayed or brushed on as a liquid.

Oil soluble petroleum sulfonates are produced as a by-product in the manufacture of white medicinal oil: and have been recognized as being more or less effective rust inhibitors when dissolved in lubricating oil. It has been found that ordinary petroleum sulfonate, even when present in relatively large proportions, as for example 10 to 15 percent, is not effective for preventing rust when employed in such oil vehicles, if the coated article is subjected to salt water spray. When used as inhibitor in petrolatum, in such relatively large proportions and the article coated therewith subjected to immersion in water or to the salt water spray test, the compositions take up water and emulsions are formed with injury or destruction of the protective coating. This appears due to the presence of water soluble sulfonates which take up water or may be leached out by the water and thus permit the penetration of moisture. Thus, an attempt to increase the effectiveness of an oil or petrolatum composition, by adding a larger percentage of such commercial sulfonates, e. g. 10 percent or over, increase the difficulty by providing a substrate more affected by the water.

In accordance with the present invention, the presence of water soluble sulfonates is restricted, and it is preferred to use sulfonate compounds which are substantially free from sulfonates which are freely soluble in water. The separation of the oil soluble and water soluble components of such commercial sulfonates can be effected by differential stratification in the presence of water and a solvent oil, with recovery of the solvent oil layer and subsequent extraction of the oil soluble sulfonates from the oil layer. It is preferred to use the sodium salts, characterized by average molecular weights in the range of about 450 to 550: sodium sulfonates of this range of molecular weights can be attained by selecting a charging stock for white oil manufacture which is of suitable molecular weight and viscosity to give substantial proportions of sodium sulfonates having molecular weights in the range of about 450 to 550, and to effect separation of the freely water soluble sulfonic acid or sulfonates therefrom, while recovering the fraction having molecular weights in the range stated and established oil solubility.

In general, the manufacture of white medicinal oil conventionally involves the treatment of a lubricating oil with fuming sulfuric acid. In such a process some tarry sludges are formed which are separated as so-called acid sludge tar. A mixture of petroleum sulfonic acids is also formed, of which the more freely water-soluble sulfonic acids are green in color or have a strong green fluorescence and are known as "green acids" which when separated generally have average molecular weights below about 400. There are also produced sulfonic acids of higher molecular weight which are brownish in color, are more oil-soluble, and are largely retained dissolved in the acid treated oil. When extracted from the oil they are commonly known as "mahogany acids" and when neutralized by an alkali the resulting compounds are known as "mahogany sulfonates."

The petroleum sulfonic acids and their alkali salts of low molecular weight compounds have relatively higher solubility in water and a lower solubility in oil, while the high molecular weight compounds have a relatively low solubility in water and a higher solubility in oil, so that separations can be effected. Such separation is not sharp or quantitative, but it has been found that the residue of green acids or their alkali salts, which is carried by solubility or entrainment with the mahogany acids or their alkali salts, has little effect when a stratification separation is performed with care to assure cleancut layer formation and to avoid having parts of the water layer decanted with the oil layer, and with recovery of the mahogany compounds with an average molecular weight above 400 and preferably above 450 computed as the sodium salt.

The alkali metal and alkaline earth salts, inclusive of the sodium, potassium, calcium and barium compounds of the oil-soluble petroleum sulfonic acids of molecular weights above 400 are soluble in petrolatum; and can successfully be employed as components of effective rust inhibitor compositions when employed in conjunction with an alkyl phenoxyl poly ether compound.

It is preferred to remove water from the petroleum sulfonate before blending, so that the water content thereof is less than 5 percent, and therewith the final rust inhibitor composition contains less than about 0.5 percent of water, preferably less than 0.4 percent.

It has been found that a synergistic effect is produced in the presence of such oil soluble petroleum sulfonates by the action of an alkyl phenoxy derivative of a polyhydric alcohol ether, for example an alkyl phenoxy tetraethoxyethanol, in which the alkyl group contains 5 to 10 carbon atoms, preferably an octyl group. It has been found that such derived compounds, prepared from commercially available bases, can have the alkyl group largely as octyl, along with lower and higher carbon components within the $C_5$ to $C_{10}$ range, and be effective for the purpose: and that alkyl group mixtures of straight and branched chains are effective. The effect of such a compound, in the presence of the sulfonate, is to produce an effect whereby smaller proportions of sulfonate can be used than would be required to give protection against rusting, particularly when subjected to salt water spray. Such derived ethanols are sparingly soluble in water, and the lower percentage of sulfonate used minimizes the tendency to form emulsions with water by any of the components.

The preferred petrolatum is a U. S. P. refined petrolatum or a semi-refined yellow petrolatum, so selected or compounded that it has a melting point range above expected temperatures of exposure. In the United States, a general purpose rust inhibiting composition preferably has an A. S. T. M. melting point in the range 115 to 123 degrees F. For special purposes, the melting point may be adjusted: for protection against rust in tropical countries, a petrolatum having a melting point range as high as 140 degrees F. may be employed, while in very cool regions the melting point may have a range as low as 100 degrees F. It is preferred to dry the petrolatum, by removing all occluded or dissolved water or moisture, before making up the composition. It has been found that the addition of the sulfonates in the desirable quantities for good protection of iron and steel alloys against rusting, i. e. 4 to 8 percent, does not appreciably affect the A. S. T. M. melting point or the consistency of the petrolatum.

The compositions of the present invention contain at least 90 percent by weight of petrolatum, over 4 percent by weight of the high molecular weight sulfonate and 0.1 to 1 percent of the alkyl phenoxy tetraethoxyethanol.

The effectiveness of such formulations, and with other rust preventive compositions not having such formulations, can be illustrated by applying the coatings to steel wool, and immersing specimens of the same in distilled water and in synthetic sea water. The following examples indicate the effects:

TABLE I

*Steel wool immersed in water*

| Composition by Weight, percent | | | Distilled Water | | Synthetic Sea Water 168 hours |
|---|---|---|---|---|---|
| Yellow Petroleum jelly | High mol. wt. sodium sulfonate | Alkyl Phenoxy ethanol comp'd | 336 hours | 672 hours | |
| 100 | | | severe rusting in 24 hours | | |
| 95.0 | 5.0 | none | good | fair | very poor. |
| 94.9 | 5.0 | 0.1 | do | good | poor. |
| 94.5 | 5.0 | 0.5 | excellent | excellent | fair. |
| 94.0 | 5.0 | 1.0 | do | do | Do. |
| 93.0 | 7.0 | none | good | fair | poor. |
| 92.0 | 7.0 | 1.0 | excellent | excellent | fair. |

The behavior likewise can be exemplified by experience with steel plates coated with such material and subjected to a salt spray test for 182 hours with a 20 percent salt solution according to the test given in U. S. Military Specification "MIL-C-10382" or in a humidity cabinet for 336 hours at a relative humidity of 100 percent, according to the test given in "MIL-C-6529A." The following table indicates the behavior:

TABLE II

*Salt water spray and humidity cabinet tests*

| | Salt Spray | Humidity Cabinet |
|---|---|---|
| Yellow petroleum jelly 100% | failed within 24 hours. | failed within 24 hours. |
| Yellow petroleum jelly 91.5% High mol. wt. sulfonate 7.5% Alkyl phenoxy comp'd. 1.0% | passes (no visible rust). | passes (no visible rust). |

In the tests indicated in Table I and Table II, the petrolatum was a yellow petrolatum having a A. S. T. M. melting point in the range 115–123 degrees F.; and therewith the preferred composition for protection of iron and steel alloys under severe conditions of high humidity and in the presence of salt water has 90–92 percent by weight of petrolatum, 1 percent by weight of octyl phenoxy tetraethoxyethanol, and the balance essentially the high molecular weight oil-soluble sodium sulfonate.

Coatings with this composition have been found to be very effective in preventing the rusting of iron and steel alloys present in wood working and machine tools, surgical and like instruments, firearms, and other machines and tools which are subject to moisture and rusting during shipment and storage. The coatings may be quickly applied, without the need of preliminary baking or like operations to remove absorbed moisture, and by use of a stiff brush or swab. The coatings also may be applied by heating until fluid and then spraying or applying by a normal paint brush. The thickness of the coatings in the tests according to Tables I and II was from 1 to 1½ mils; indicating that the film thickness was not sufficient to demand removal in many instances before employment of the coated article. When desired, the coating can be quickly removed by washing or swabbing with a hydrocarbon solvent.

It will be understood that the composition is not limited in its employment to the practices stated, and that it may be prepared in other specific formulations and used for other purposes, within the scope of the appended claims.

What is claimed is:

1. A semi-solid rust inhibiting composition consisting essentially of at least 90 percent by weight of a petrolatum having a melting point in the range of 100 to 140 degrees F., about 0.1 to 1 percent of an alkyl phenoxy tetraethoxyethanol in which the alkyl group contains from 5 to 10 carbon atoms, and over 4 percent of oil-soluble petroleum sulfonates selected from the group consisting of alkali and alkaline earth sulfonates and having an average molecular weight above 400 computed as sodium sulfonate and characterized by the essential absence of water soluble sulfonate, said composition containing less than 0.5 percent water.

2. A composition as in claim 1, in which the petrolatum has a melting point in the range of 115 to 123 degrees F.

3. A composition as in claim 1, with employment of sodium oil-soluble petroleum sulfonates having an average molecular weight of 450 to 550.

4. A composition as in claim 1, in which the said ethanol compound is octyl phenoxy tetraethoxyethanol.

5. A composition as in claim 1, containing less than 0.4 percent water.

6. A semi-solid rust inhibiting composition consisting essentially of 91 to 92 percent by weight of petrolatum having a melting point in the range of 115–123 degrees F., 1 percent by weight of octyl phenoxy tetraethoxyethanol, and 7 to 8 percent by weight of oil-soluble sodium petroleum sulfonate having an average molecular weight in the range of 450 to 550 and characterized by the essential absence of water soluble sulfonate, said composition containing less than 0.4 percent water.

References Cited in the file of this patent

UNITED STATES PATENTS

| | | |
|---|---|---|
| 2,485,150 | Glavis et al. | Oct. 18, 1949 |
| 2,485,376 | Glavis et al. | Oct. 18, 1949 |
| 2,593,676 | Irwin | Apr. 22, 1952 |
| 2,681,315 | Tongberg et al. | June 15, 1954 |